United States Patent
Li et al.

(10) Patent No.: US 10,146,677 B2
(45) Date of Patent: *Dec. 4, 2018

(54) SUSPECT CODE DETECTION IN SOFTWARE REGRESSION

(71) Applicant: International Business Machines Corporation, Armonk, NY (US)

(72) Inventors: Xiayang Li, Chatswood (AU); CongPeng Ma, Epping (AU); Vatsla Nagpaul, Holroyd (AU); Mark T. H. Taylor, Hornsby (AU)

(73) Assignee: INTERNATIONAL BUSINESS MAHCINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,101

(22) Filed: Apr. 26, 2018

(65) Prior Publication Data

US 2018/0239695 A1 Aug. 23, 2018

Related U.S. Application Data

(63) Continuation of application No. 15/431,416, filed on Feb. 13, 2017, now Pat. No. 9,983,989.

(51) Int. Cl.
  *G06F 9/44* (2018.01)
  *G06F 11/36* (2006.01)
  *G06F 8/75* (2018.01)

(52) U.S. Cl.
  CPC ............ *G06F 11/3692* (2013.01); *G06F 8/75* (2013.01)

(58) Field of Classification Search
  CPC ........................................................ G06F 9/44
  USPC .................................................. 717/124–127
  See application file for complete search history.

(56) References Cited

U.S. PATENT DOCUMENTS

| | | | | |
|---|---|---|---|---|
| 7,539,977 | B1 * | 5/2009 | Bloom ................ | G06F 11/3604 717/124 |
| 2010/0146340 | A1 * | 6/2010 | Bhate .................. | G06F 11/3676 714/38.14 |
| 2013/0047140 | A1 * | 2/2013 | Shann ................. | G06F 11/3664 717/128 |

OTHER PUBLICATIONS

Appendix P, 2018.

* cited by examiner

*Primary Examiner* — Jae U Jeon
(74) *Attorney, Agent, or Firm* — Garg Law Firm, PLLC; Rakesh Garg; Scott S. Dobson

(57) ABSTRACT

A set of test cases is executed on a base code to produce a baseline result and on a changed code to produce a new result. From the baseline result and the new result, a first subset of tests cases is determined that are failing with the changed code but were not failing with the base code. A set of code blocks is determined in the changed code that includes those code blocks that are referenced by the first subset of test cases. A second subset is formed from the first subset by disregarding an unchanged code block that has remained unchanged from the base code to the changed code. A remaining code block is shortlisted for investigating based on a ranking of the remaining code block, which uses a number of test cases in the first subset of test cases that reference the remaining code block.

20 Claims, 5 Drawing Sheets

SUSPECT CODE DETECTION IN SOFTWARE REGRESSION

TECHNICAL FIELD

The present invention relates generally to a method, system, and computer program product for detecting causes of failures in software testing. More particularly, the present invention relates to a method, system, and computer program product for suspect code detection in software regression.

BACKGROUND

Software products include software code. A software product is also interchangeably referred to herein as a "product" unless expressly distinguished where used. The software code is also interchangeably referred to herein as "code", "product code", or "software" unless expressly distinguished where used.

The code of a software product has to be tested. The testing is generally performed using a large set of test cases. In many cases, the testing using the test cases is automated.

These tests are executed after changes have been made to the product code. If in a test execution, some of the previously passing tests begin to fail, the cause of the failures must be found. Where the software product's testing environment, the tests themselves, and other factors affecting the product and tests have not changed, it can be assumed that any change in the test results is caused by the set of code changes.

Regression of software is an occurrence of an error or a failure in the software where the error or failure was previously not observed. In other words, software regression is the opposite of making process in software, i.e., instead of removing a failure or error from the software, a failure, error, or other undesirable behavior has been introduced into the software.

SUMMARY

The illustrative embodiments provide a method, system, and computer program product. An embodiment includes a method that executes, using a processor and a memory, a set of test cases on a base code to produce a baseline result. The embodiment executes, using the processor and the memory, the set of test cases on a changed code to produce a new result. The embodiment determines from the baseline result and the new result, a first subset of tests cases that are failing with the changed code but were not failing with the base code. The embodiment determines a set of code blocks in the changed code, wherein the set of code blocks in the changed code includes those code blocks that are referenced by the first subset of test cases. The embodiment disregards, from the first subset to form a second subset of code blocks, an unchanged code block, wherein the unchanged code block has remained unchanged from the base code to the changed code. The embodiment shortlists a remaining code block for investigating a regressive behavior of the changed code, the shortlisting being based on a ranking of the remaining code block in the second subset, wherein the ranking uses a number of test cases in the first subset of test cases that reference the remaining code block.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
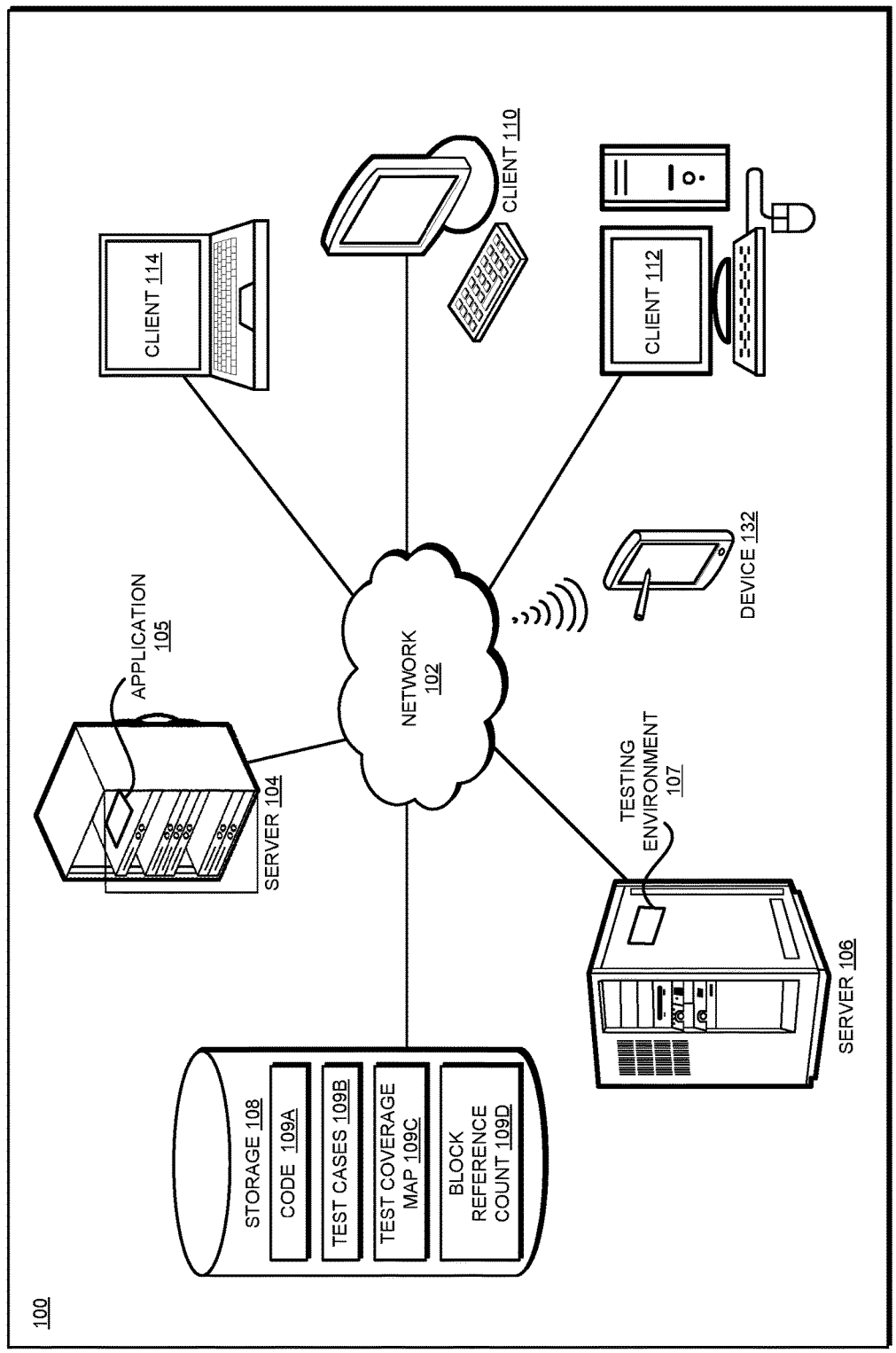
FIG. 1 depicts a block diagram of a network of data processing systems in which illustrative embodiments may be implemented.

While an assumption can be safely made that the cause of a regression in the product behavior may be due to a set of changes that has been made to the code, which particular changes within the set of code changes are responsible for the regression is often not clear. Presently, determining which changes are responsible for a regression is a manual process. A software developer has to examine the regression by using the knowledge of the product code and the tests available to the developer, and by expending skill and effort in debugging, to find the cause of the regression.

The illustrative embodiments recognize that this presently used manual process for cause determination in software regression is slow, requires expert knowledge of the product code, and skills in deductive reasoning. The illustrative embodiments recognize that such resources are often scarce, expensive, or both. Thus, using the presently available methods, the benefit of automated testing is reduced as the time taken to identify the cause of a regression increases.

Therefore, the illustrative embodiments recognize that a method and tool are needed that automatically identify the suspect changes with the highest likelihood of being the cause of a regression. Furthermore, such a method and tool should be significantly faster than the speed of the presently available manual process, and consume significantly less skilled expert resources as compared to the presently available manual process.

The illustrative embodiments recognize that the presently available tools or solutions do not address these needs or provide adequate solutions for these needs. The illustrative embodiments used to describe the invention generally address and solve the above-described problems and other problems related to suspect code detection in software regression.

An embodiment can be implemented as a software application. The application implementing an embodiment can be configured as a modification of an existing software testing system, as a separate application that operates in conjunction with an existing software testing system, a standalone application, or some combination thereof.

A base code is a version of code that is to be changed. Changed code is a version of the code after a set of one or more changes have been applied to the base code. A code block is a portion of code. The portion can include, but need not necessarily be, a function, method, or subroutine. For example, a code block can be a single line of code or several lines of code that are less than the entirety of a function, method, or subroutine.

An embodiment executes a set of test cases on a base code. The embodiment collects two types of data from the test execution—

Test coverage map—a mapping of a test in the set of tests to code blocks in the code. This mapping shows which code blocks are exercised by a particular test. This mapping is captured for each test in the set of tests.

Test reference count—a total number of times a code block is called, used, exercised, or otherwise referenced by any test in the set of tests. This data is captured for each code block that has been identified in any suitable manner in a given code.

The test execution that produces these two types of data can be performed offline, i.e., the data need not be captured while the code is executed for its intended purpose, e.g., in a production environment. The code can be pulled from a code library into a testing environment, the tests executed on the code, and the data captured. The tests can be executed as and when needed, e.g., when something changes in the test environment, or as a routine periodic activity.

An embodiment generates a baseline result. Particularly, to generate the baseline result, the embodiment executes the set of tests on the base code, and identifies as a part of the baseline result those tests that are failing with the base code. In some cases, the baseline result may be generated as a rolling series of regression test runs. In some other cases, the baseline result may be generated when regression is experienced in a changed code.

With the baseline established, the embodiment executes the same set of tests on the changed code to produce a new result. Particularly, to generate the new result, the embodiment executes the set of tests on the changed code, and identifies as a part of the new result those tests that are failing with the changed code.

Using the baseline result and the new result, an embodiment selects only those tests that are newly failing with the changed code, i.e., those tests that were not failing with the base code but are failing with the changed code.

An embodiment uses the test coverage map produced offline earlier to identify those code blocks that are exercised by the newly failing tests. The embodiment thus selects a subset of a set of blocks identified in the code. For example, if the set of blocks includes blocks (A, B, C, D, E), and blocks A, C, and D are exercised by some combination of newly failing tests, the subset includes (A, C, D)

From the subset of the blocks exercised by the newly failing tests, the embodiment removes, rejects, or otherwise disregards those blocks that have not changed in the changed code. For example, if the subset includes (A, C, D) and only blocks A and D have changed in the changed code but not block C, the sub-subset of changed blocks exercised by the newly failing tests would include blocks (A, D). The sub-subset of blocks are the suspect blocks, i.e., these blocks are suspect for causing the regression.

For each suspect block, an embodiment counts a number of times any combination of one or more of the newly failing tests has referenced the suspect block. This number is referred to as failing test count of a suspect block. The embodiment computes a ratio by dividing the failing test count of a suspect block by the test reference count of the suspect block. Recall that the test reference count of the suspect block was captured with the base code.

An embodiment computes a ratio corresponding to each suspect block in the sub-subset. The embodiment computes a ranking of the suspect blocks within the sub-subset by applying a function to the ratio. In one embodiment, the ratio itself is used as a ranking.

The ranking produced in this manner reveals the suspects in the order from the most likely to the least likely to have caused a regressive behavior in the changed code. In some cases, all suspect bocks can then be investigated for errors or causes of regression. In some other cases, a need may exist to limit the number of suspect blocks that should be investigated. Therefore, one embodiment identifies or selects only the highest ranking suspect block. Another embodiment identifies or selects those ranked suspect blocks for investigation whose rank exceed a threshold rank.

The manner of suspect code detection in software regression described herein is unavailable in the presently available methods. A method of an embodiment described herein, when implemented to execute on a device or data processing system, comprises substantial advancement of the functionality of that device or data processing system in identifying suspect code blocks with a desired likelihood of causing a regressive behavior. The identification of the suspect blocks is significantly faster and less expensive than the investigation methods available in the prior-art.

The illustrative embodiments are described with respect to certain types of code, tests, blocks, counts, regression, changes, ratios, rankings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
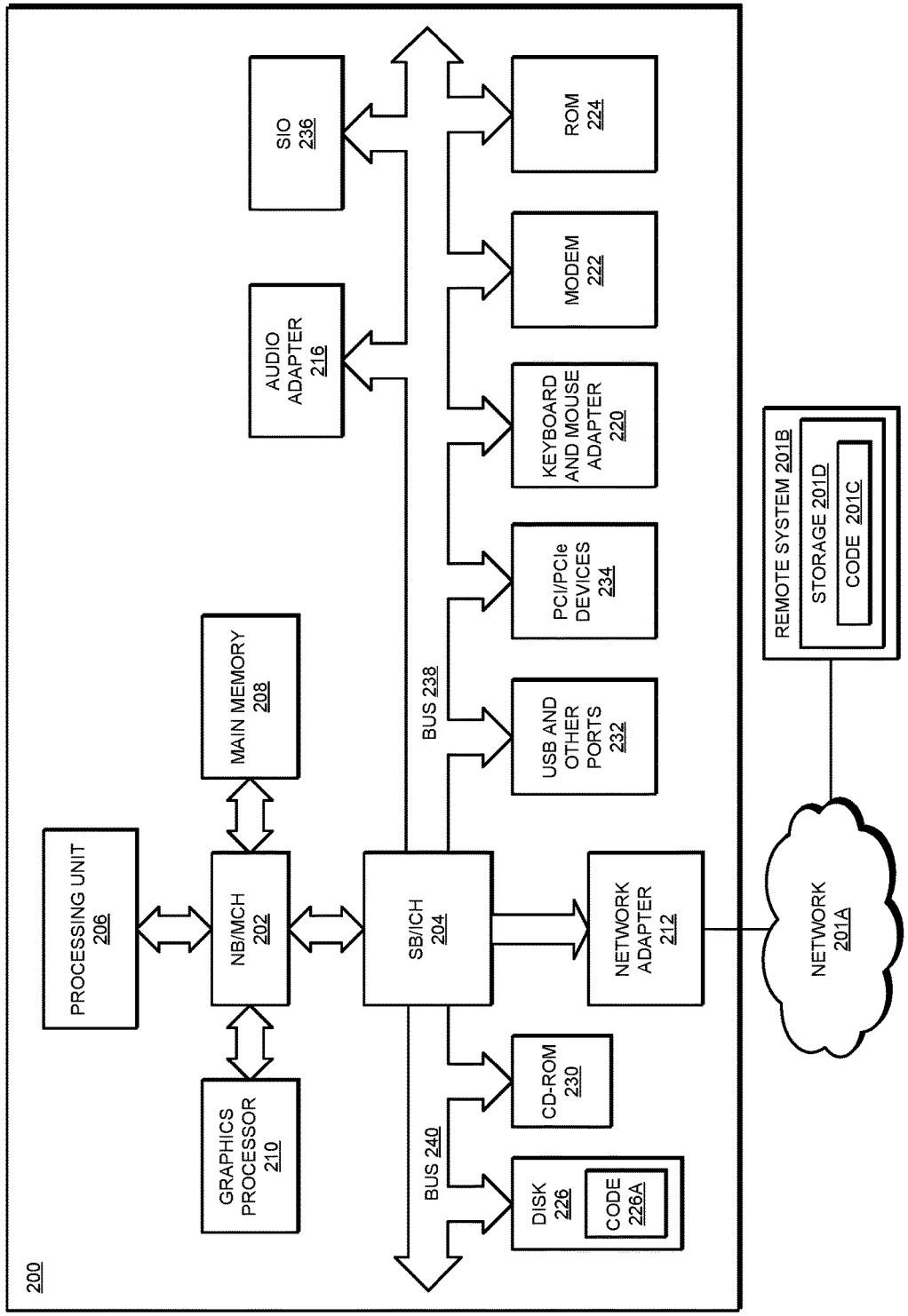
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Code 109A includes base code and changed code as described herein. Test cases 109B are a set of test cases applicable to code 109A. Test coverage map 109C is an example mapping constructed by application 105 on base code from code 109A by executing tests 109B on the base code in testing environment 107. Block reference count 109D includes count data generated by application 105 by executing tests 109B on the base code from code 109A in testing environment 107.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
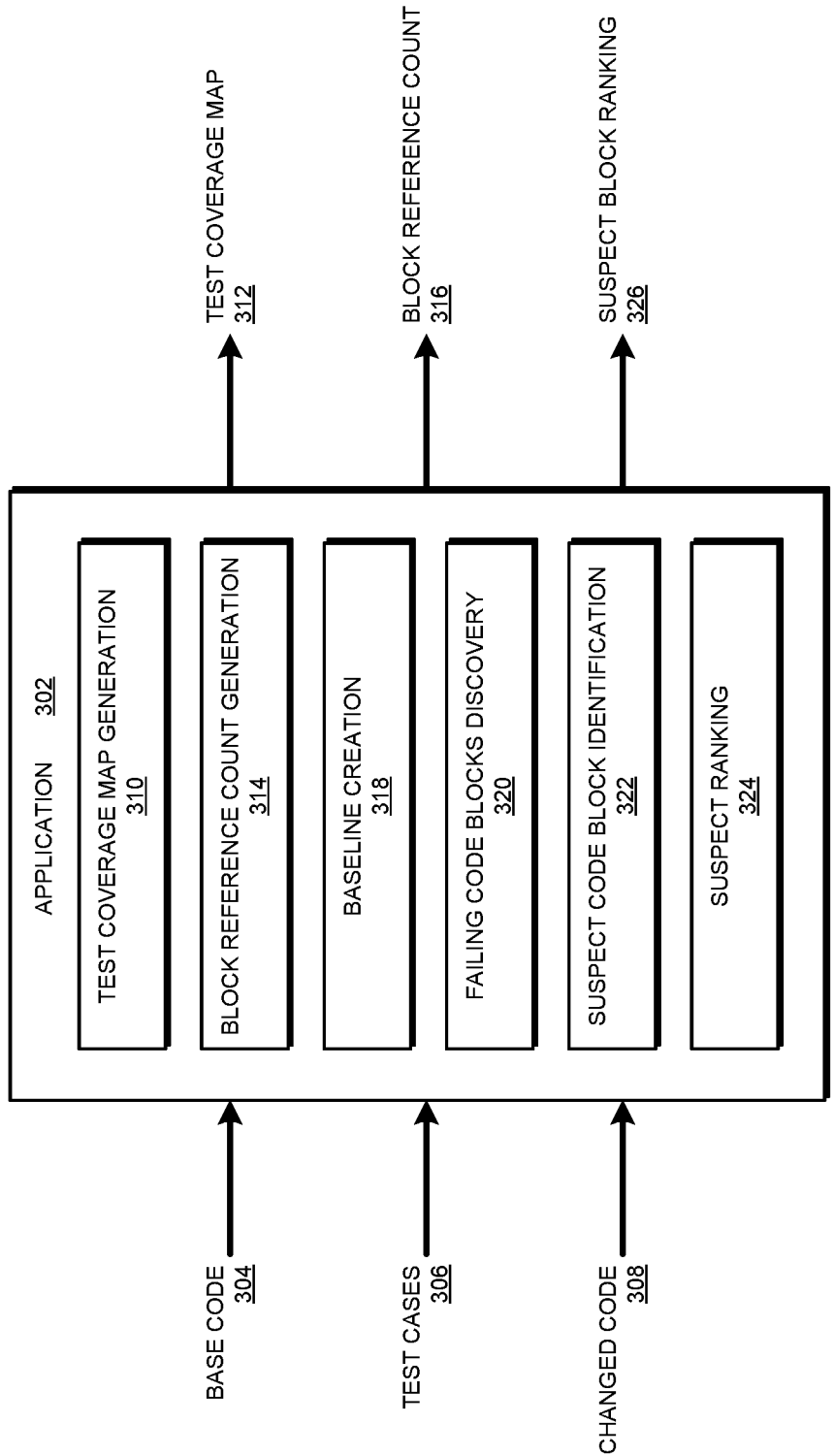
FIG. 3 depicts a block diagram of an example configuration for suspect code detection in software regression in accordance with an illustrative embodiment.

With reference to FIG. 3, this figure depicts a block diagram of an example configuration for suspect code detection in software regression in accordance with an illustrative embodiment. Application 302 is an example of application 105 in FIG. 1.

Base code 304 is an example of base code in code 109A in FIG. 1. Test cases 306 is an example of test cases 109B in FIG. 1. Changed code 308 is an example of changed code in code 109A in FIG. 1.

Component 310 executes test cases 306 on base code 304 and produces test coverage map 312, as described herein. From the execution of test cases 306 on base code 304, component 314 generates block reference count 316, as described herein.

At an appropriate time, component 318 constructs a baseline result for base code 304 using test cases 306. Component 320 executes test cases 306 on changed code 308 to discover those code blocks that are referenced by at least one newly failing test case 306. Component 322 identifies the suspect blocks, i.e., the blocks that are referenced by at least one newly failing test case 306 and which have changed in changed code 308.

Component 324 computes a ranking of the suspect blocks as described herein. Suspect block ranking 326 may include all suspect blocks with their corresponding ranks, or only those suspect blocks whose ranks exceed a threshold rank, as the implementation-specific case may be.

Figure 4:
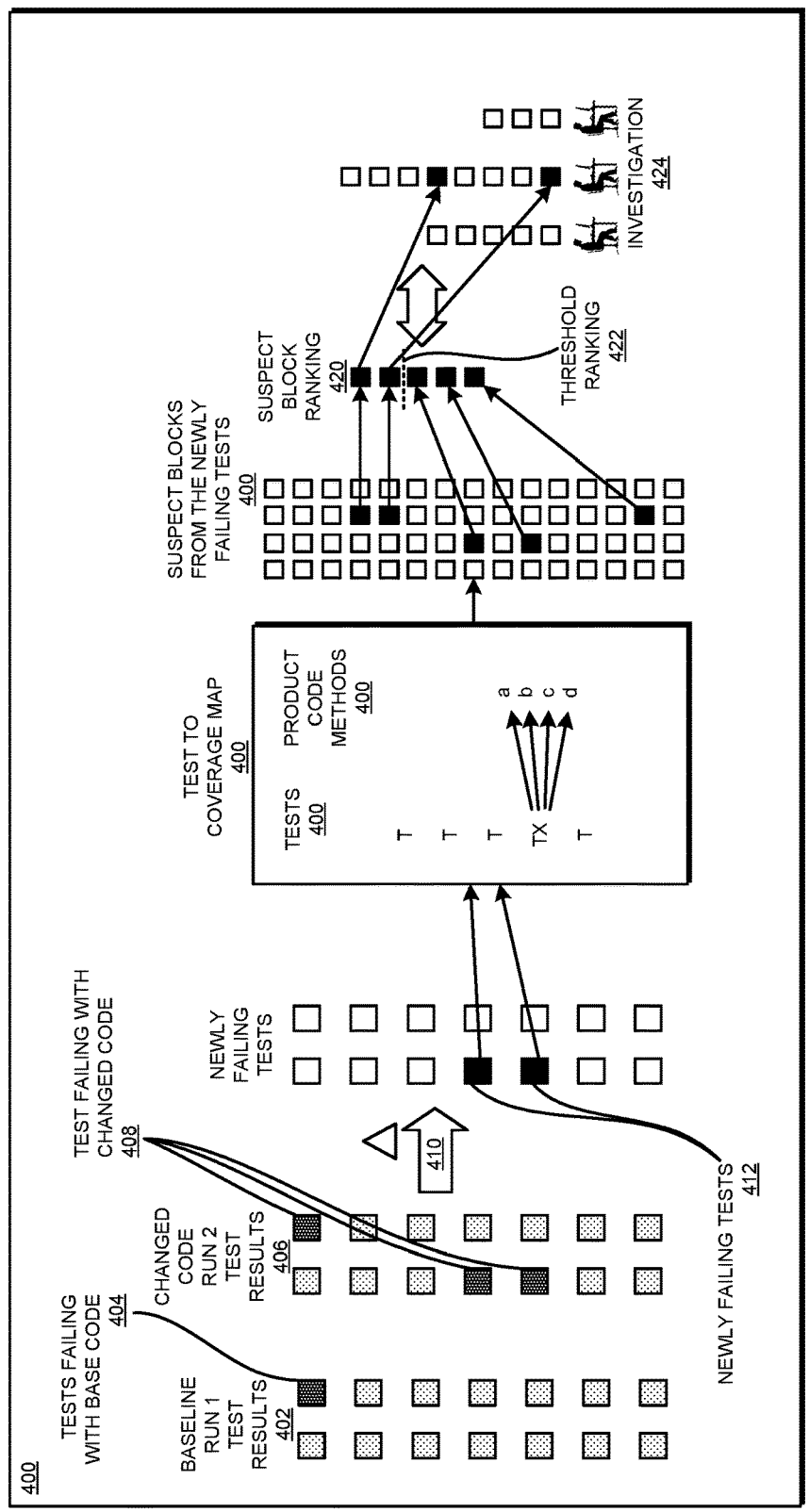
FIG. 4 depicts a block diagram of a process for suspect code detection in software regression in accordance with an illustrative embodiment.

With reference to FIG. 4, this figure depicts a block diagram of a process for suspect code detection in software regression in accordance with an illustrative embodiment. Process 400 can be observed as a result of an operation of application 302 in FIG. 3.

Executing test cases in baseline run 402 shows tests 404 that are failing with the base code. Executing the same test cases with changed code in new run 406 shows tests 408 that are failing with the changed code. Delta operation 410 identifies newly failing tests 412.

Test coverage map 416 reveals all suspect blocks 418 in the changed code, as described herein. Suspect block ranking operation 420 ranks the suspect blocks.

In many cases, the highest ranking suspect block can be automatically submitted for investigation. In some cases, investigating more than one suspect blocks may be justified. In such cases, a percentile threshold on the ratio—e.g., suspect blocks with the top ten percent of the ratios—or a threshold rank—e.g., top three ranking suspect blocks—can be used. If threshold ranking 422 is used to shortlist the suspect blocks, suspect blocks with ranks satisfying threshold 422 are sent for investigation 424.

Additionally, one embodiment can further facilitate the automatic investigation of the suspect blocks. For example, when the most likely suspect block has been identified in a manner described herein, the embodiment can further associate particular changes from the change set that are present in the identified suspect block. With this capability, not only is the suspect block identified but the change therein that introduced the regressive behavior can also be automatically identified. This manner of automatic change identification further advantageously expedites and automates the investigative process in regression testing.

Figure 5:
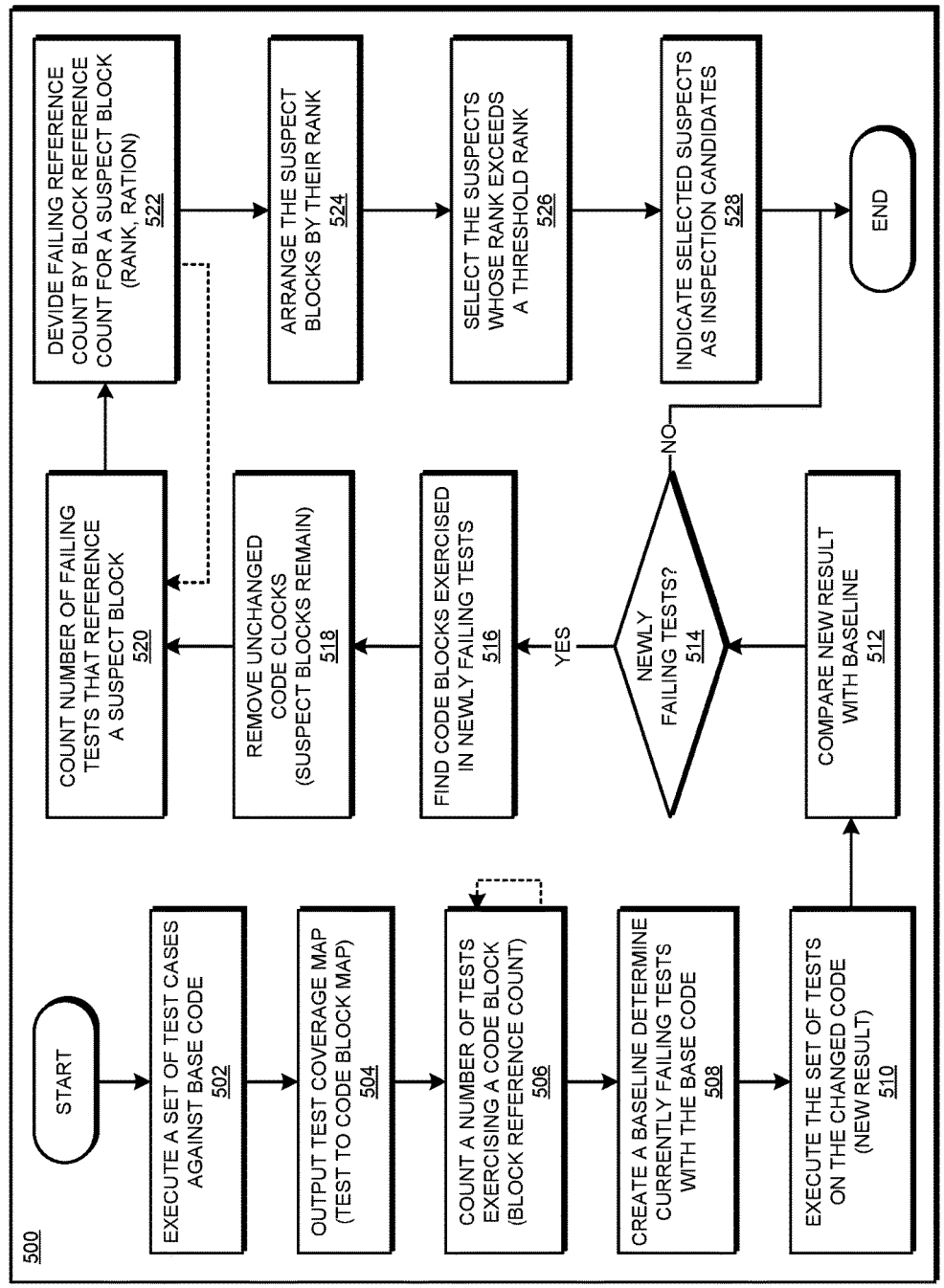
FIG. 5 depicts a flowchart of an example process for suspect code detection in software regression in accordance with an illustrative embodiment.

With reference to FIG. 5, this figure depicts a flowchart of an example process for suspect code detection in software regression in accordance with an illustrative embodiment. Process 500 can be implemented in using application 302 in FIG. 3.

The application executes a set of test cases on a base code (block 502). The application outputs a test coverage map from the execution (block 504).

The application counts a number of tests that exercise a code block in the base code (block 506). The application repeats block 506 for as many code blocks as may have been identified in any suitable manner in the base code.

The application creates a baseline result using a set of tests on a base code, which determines the tests that are failing with the base code (block 508). The application executes the set of tests on the changed code to produce a new result (block 510). The application compares the new result with the baseline result (block 512).

Based on the comparison—the delta operation, the application determines whether the new result shows any newly failing tests (block 514). If no newly failing tests are found in the new result ("No" path of block 514), the application ends process 500 thereafter.

If newly failing tests are found in the new result ("Yes" path of block 514), the application finds those code blocks that are exercised by the newly failing tests (block 516). From the identified blocks, the application removes or disregards those blocks that are unchanged from the base code to the changed code, letting only the suspect blocks remain for further consideration in the identified blocks (block 518).

For each suspect block, the application counts a number of failing tests that reference the block, i.e., the failing test count of a suspect block (block 520). The application computes a ratio by dividing the failing test count of a suspect block by the test reference count of the suspect block, and computes a ranking of the suspect block using the ratio (block 522). The application repeats blocks 520-522 for each suspect block.

The application arranges the suspect blocks in a descending order of their rankings (block 524). When a threshold ranking is used, the application selects those ranked suspect blocks whose ranks exceed the threshold rank (block 526). The application outputs the selected ranked suspect blocks for investigation (block 528). The application ends process 500 thereafter.

Thus, a computer implemented method, system or apparatus, and computer program product are provided in the illustrative embodiments for suspect code detection in software regression and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
executing, using a processor and a memory, a set of test cases on a base code to produce a baseline result;
executing, using the processor and the memory, the set of test cases on a changed code to produce a new result;
determining from the baseline result and the new result, a first subset of tests cases that are failing with the changed code but were not failing with the base code;

determining a set of code blocks in the changed code, wherein the set of code blocks in the changed code includes those code blocks that are referenced by the first subset of test cases;

disregarding, from the first subset to form a second subset of code blocks, an unchanged code block, wherein the unchanged code block has remained unchanged from the base code to the changed code;

ranking a remaining code block in the second subset, wherein the ranking is based on a ratio of a number of test cases in the first subset of test cases that reference the remaining code block and a block reference count of the remaining code block.

2. The method of claim 1, further comprising:

performing a test execution of the set of test cases on the base code in a test environment; and computing from the test execution a block reference count, wherein the block reference count comprises a count for each code block in the base code, wherein the count for a specific code block is a number of test cases in the set of test cases that refer to the specific code block during the test execution.

3. The method of claim 2, further comprising:

computing the ranking of the remaining code block by applying a function to the ratio.

4. The method of claim 1, further comprising:

performing a test execution of the set of test cases on the base code in a test environment;

computing from the test execution a test coverage map, wherein the test coverage map identifies for each specific test case in the set of test cases a corresponding specific set of blocks in the base code, wherein the specific test case refers to the code blocks in the corresponding specific set of code blocks during an execution of the specific test case on the base code.

5. The method of claim 1, wherein the code block is a portion of a code of a complete function.

6. The method of claim 1, wherein a test case refers to a code block by causing the code block to execute during an execution of the test case.

7. The method of claim 1, further comprising: determining, from the baseline result, that a first test case is failing with the base code; and excluding the first test case from the first subset.

8. A computer usable program product comprising at least one computer-readable storage medium, and program instructions stored on the at least one storage medium, the stored program instructions comprising:

program instructions to execute, using a processor and a memory, a set of test cases on a base code to produce a baseline result;

program instructions to execute, using the processor and the memory, the set of test cases on a changed code to produce a new result;

program instructions to determine from the baseline result and the new result, a first subset of tests cases that are failing with the changed code but were not failing with the base code;

program instructions to determine a set of code blocks in the changed code, wherein the set of code blocks in the changed code includes those code blocks that are referenced by the first subset of test cases;

program instructions to disregard, from the first subset to form a second subset of code blocks, an unchanged code block, wherein the unchanged code block has remained unchanged from the base code to the changed code; and program instructions to rank a remaining code block in the second subset, wherein the ranking is based on a ratio of a number of test cases in the first subset of test cases that reference the remaining code block and a block reference count of the remaining code block.

9. The computer usable program product of claim 8, further comprising:

program instructions to perform a test execution of the set of test cases on the base code in a test environment; and program instructions to compute from the test execution a block reference count, wherein the block reference count comprises a count for each code block in the base code, wherein the count for a specific code block is a number of test cases in the set of test cases that refer to the specific code block during the test execution.

10. The computer usable program product of claim 9, further comprising:

program instructions to compute the ranking of the remaining code block by applying a function to the ratio.

11. The computer usable program product of claim 8, further comprising:

program instructions to perform a test execution of the set of test cases on the base code in a test environment;

program instructions to compute from the test execution a test coverage map, wherein the test coverage map identifies for each specific test case in the set of test cases a corresponding specific set of blocks in the base code, wherein the specific test case refers to the code blocks in the corresponding specific set of code blocks during an execution of the specific test case on the base code.

12. The computer usable program product of claim 8, wherein the code block is a portion of a code of a complete function.

13. The computer usable program product of claim 8, wherein a test case refers to a code block by causing the code block to execute during an execution of the test case.

14. The computer usable program product of claim 8, further comprising: determining, from the baseline result, that a first test case is failing with the base code; and excluding the first test case from the first subset.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to execute a set of test cases on a base code to produce a baseline result;

program instructions to execute the set of test cases on a changed code to produce a new result;

program instructions to determine from the baseline result and the new result, a first subset of tests cases that are failing with the changed code but were not failing with the base code;

program instructions to determine a set of code blocks in the changed code, wherein the set of code blocks in the changed code includes those code blocks that are referenced by the first subset of test cases;

program instructions to disregard, from the first subset to form a second subset of code blocks, an unchanged code block, wherein the unchanged code block has remained unchanged from the base code to the changed code;

program instructions to rank a remaining code block in the second subset, wherein the ranking is based on a ratio of a number of test cases in the first subset of test cases that reference the remaining code block and a block reference count of the remaining code block.

18. The computer system of claim 17, further comprising:
program instructions to perform a test execution of the set of test cases on the base code in a test environment; and
program instructions to compute from the test execution a block reference count, wherein the block reference count comprises a count for each code block in the base code, wherein the count for a specific code block is a number of test cases in the set of test cases that refer to the specific code block during the test execution.

19. The computer system of claim 18, further comprising:

program instructions to compute the ranking of the remaining code block by applying a function to the ratio.

20. The computer system of claim 17, further comprising:

program instructions to perform a test execution of the set of test cases on the base code in a test environment;

program instructions to compute from the test execution a test coverage map, wherein the test coverage map identifies for each specific test case in the set of test cases a corresponding specific set of blocks in the base code, wherein the specific test case refers to the code blocks in the corresponding specific set of code blocks during an execution of the specific test case on the base code.

\* \* \* \* \*